Dec. 3, 1957        F. ABELL        2,815,438
INSTRUMENT LIGHTING SYSTEM
Filed Feb. 4, 1955
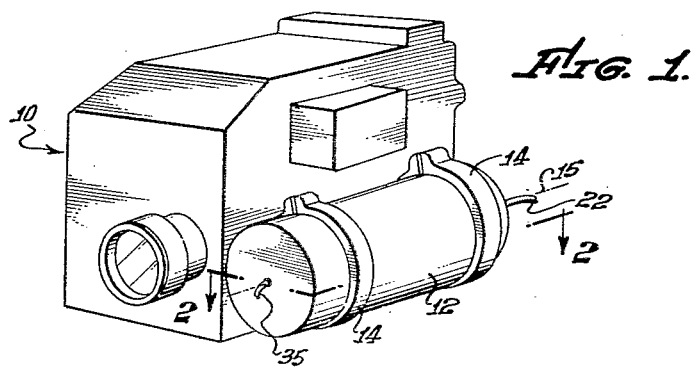
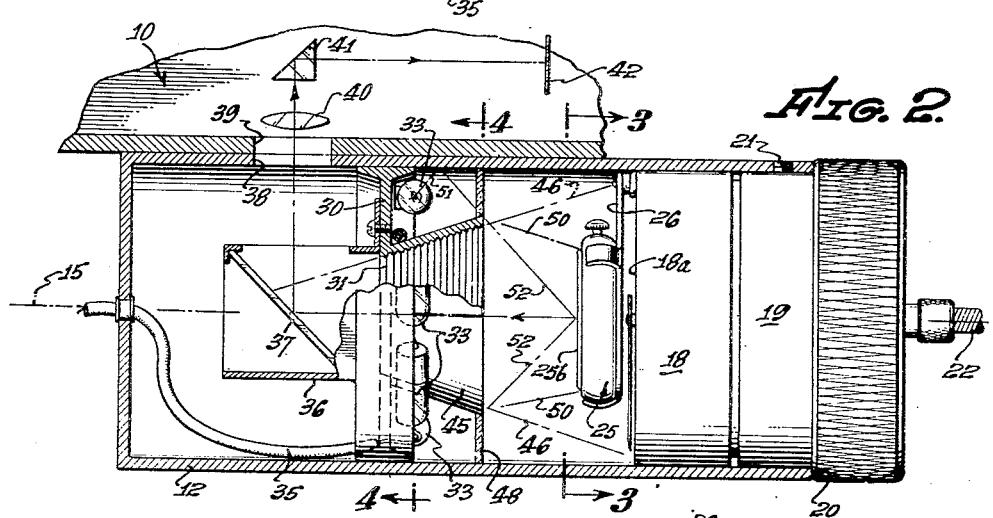
FRANK ABELL,
INVENTOR.
BY *Knight & Rodgers*
ATTORNEYS

# United States Patent Office 2,815,438
Patented Dec. 3, 1957

2,815,438

INSTRUMENT LIGHTING SYSTEM

Frank Abell, Inglewood, Calif.

Application February 4, 1955, Serial No. 486,156

11 Claims. (Cl. 240—1.3)

The present invention relates generally to means for equally illuminating areas which are at different distances from the light source but are to be photographed simultaneously; and more especially, to means to be used as an attachment for a camera making a photographic record of a vehicle speed by producing a composite photograph of the vehicle and instruments which record speed and time, such attachment effecting substantially uniform and equal illumination for these different instruments.

There is shown in my Patent Number 2,379,404, issued July 3, 1945, suitable apparatus for photographically recording the speed of motor vehicles, in general, this comprises a camera of the motion picture type adapted to take single exposures. This camera is provided at one side with an attached separate housing in which is enclosed a stop watch indicating the time of the exposure and a speedometer indicating the speed at which the vehicle carrying the camera is moving. These instruments are illuminated from a single light source within the housing. An image of both instruments is transmitted by a system of prisms and lenses onto a portion of the camera film. The result is a composite photograph of the moving vehicle along with the watch and speedometer.

An arrangement of this type shown in my aforesaid patent has been found to offer several disadvantages from a practical standpoint. In the first place, it has been difficult to adequately illuminate both of the instruments, not only because of the small amount of illumination available when only a single lamp is the light source but also because of the long distance between the light source and the instruments necessary when the light source is placed beyond the prism or other means provided to reflect the images out of the housing containing the instruments.

Another disadvantage of an arrangement such as shown in my aforesaid patent is that the two instrument faces are illuminated unequally when illuminated directly from the same light source. Since the instrument faces are unequal distances from the common light source, the intensity of illumination at the two faces is different since it is inversely proportional to the square of their distances from the light source. This creates a considerable problem since one instrument face is ordinarily under exposed or over exposed when the other one is properly exposed and consequently the final composite photograph may be imperfect in some of the information recorded.

Another problem has arisen in connection with direct illumination of the stop watch. The light source may be reflected off the crystal covering the stop watch face and this reflection produces a bright spot or halation on the final photograph. This halation destroys the reading when the hand of the stop watch is at this position on the face of the stop watch. Removal of the crystal eliminates halations but exposes the watch to damage, both from blows bending the hands and dust entering the mechanism.

Thus it is a general object of my invention to place the faces of the two instruments to be photographed as close as possible to the light source in order to obtain the maximum amount of light on the instrument faces. This not only makes for better images of the instruments on the final photograph but also reduces the exposure time required, allowing the camera shutter to operate at a higher speed or a smaller diaphragm stop to be used thus making the camera serviceable under a wider range of conditions.

It is also an object of my invention to make the housing containing the light and the instruments as short as possible in order to reduce the amount of space required by the complete recording apparatus and also to improve the construction from a mechanical standpoint.

A further object of my invention is to illuminate both faces of the two instruments evenly and at substantially the same intensity, even though the instruments are placed at different distances from a common source of light. Even illumination has obvious advantages in eliminating spots which are lighted either too much or too little; and equal intensity of illumination on both instruments permits them both to be photographed equally well for a given shutter speed of the camera.

A further object is to provide a lighting system that allows the retention of the normal glass over the watch face to protect the face and the mechanism but without interfering with adequate photography. More especially is it an object to be able to use a flat crystal which improves the photographic images by giving a clearer image without halations.

Still another object is to provide a system in which the light source is not larger in diameter than the larger area to be photographed. This permits a compact arrangement in which all elements are enclosed in a cylindrical housing but without directly reflecting images of the light source onto the film to produce bright spots.

The above and other objects of my invention have been achieved by providing a lighting system for illuminating with approximately equal intensity two separate areas, corresponding respectively to the two instrument faces, which are located at different distances from a common light source. The system is placed within a tubular housing enclosing the two instrument faces which are normally located in spaced parallel planes. Spaced from the instrument faces is a source of light, which is preferably of annular formation and arranged to illuminate directly the remote instrument face. An opaque shield is located between the light source and the instrument faces to shade the nearer instrument face from light rays which would reach it directly from the light source. This nearer one of the instrument faces is illuminated by indirect light at approximately the same intensity as the remote face which is directly illuminated. The indirect light comprises light rays that either are reflected off the inside surface of the housing wall or are deflected by passing through a light diffusing member; or, in a preferred embodiment, a combination of rays of these two kinds which may encounter different means for deflecting a portion of the incident direct light to illuminate the nearer instrument by indirect lighting.

How the above objects and advantages of my invention, as well as others not specifically mentioned, are attained will be more readily understood by reference to the following description and to the annexed drawings, in which:

Fig. 1 is a perspective elevation of a camera to which is attached the housing enclosing my improved lighting system;

Fig. 2 is a horizontal median section through the housing on line 2—2 of Fig. 1, showing only a fragmentary portion of the camera;

Fig. 3 is a vertical transverse section through the housing on line 3—3 of Fig. 2 showing the instrument faces in elevation; and Fig. 4 is a vertical transverse section on line 4—4 of Fig. 2 with a portion of the light diffusing member broken away to show the lamps constituting the source of illumination.

Referring now to the drawings, there is shown in Fig. 1 a typical motion picture camera 10 on one side of which there is attached housing 12 by means of split clamping rings 14. Housing 12 is tubular in shape and is preferably circular in cross section because the instruments to be photographed within the housing are circular in outline. The longitudinal axis of housing 12 is indicated at 15.

Housing 12 is open at one end to receive the instruments to be photographed. These include speedometer 18 which may be of any conventional design. Speedometer 18 is mounted upon a base 19 which has a snug sliding fit in one end of housing 12 and is provided with a shoulder 20 which abuts the end of the housing in order to locate the face 18a of the speedometer at a predetermined position within the housing. A set screw 21 or other means may be provided to hold the speedometer with its face 18a at the proper position within the housing. The speedometer is driven through flexible drive shaft 22 in a conventional manner, the drive shaft being connected to a suitable element of the vehicle, not shown.

The other instrument to be photographed is stop watch 25 which is mounted on and in front of speedometer 18 by means of a spring mounting clip 26. For reasons which will be obvious from the following description, the faces 25a and 18a of stop watch 25 and speedometer 18 respectively are located in planes which are perpendicular to axis 15 and are therefore parallel to each other. These planes are spaced apart along axis 15, a condition made necessary by the use of separate instrumentalities for indicating speed and time. Faces 25a and 18a form the area to be illuminated and photographed.

At a suitable position between the instruments at 18 and 25 and the closed end of the tube, there is located opaque ring 30. Ring 30 fits tightly against the inside wall of housing 12 in order to prevent light from leaking around the ring. Ring 30 has a central opening 31 which is concentric with axis 15.

Mounted on ring 30 on the side facing the instruments to be photographed, which side is sometimes hereinafter referred to as the forward side of the ring, is a plurality of small lamps 33 which collectively form a common light source for illuminating the faces of the stop watch and the speedometer. As shown particularly in Fig. 4, the several lamps are evenly spaced around ring 30 and provide a light source which may be considered as having an annular configuration. In the device illustrated, there are six such lamps but it will be understood that the invention is not necessarily limited to this particular number. In general, it is desirable to use as many lamps as possible in the space available, the lamps being spaced evenly and as closely together as possible in order to obtain the maximum amount of light from the source with as even a distribution as possible of the lamps around ring 30. Conductor 35 is connected to the several lamps 33 and passes out of the housing through the end wall to be connected to a suitable source, not shown, of electric power on the vehicle.

On the back side of ring 30, that is the side away from the light source, there is attached holder 36 which supports mirror 37 behind opening 31 in the ring. Mirror 37 is inclined 45° with respect to axis 15 so that the image of the instruments passing through ring opening 31 and falling upon mirror 37 is reflected at right angles to axis 15 through registering apertures 38 and 39 in the side walls of housing 12 and camera 10 respectively. The image is focused by lens 40 and then reflected by prism 41 onto light sensitive film 42 within the camera. A conventional shutter, not shown, is located between prism 41 and film 42, as shown in my patent referred to above. It will be realized that lens 40 and prism 41 represent suitable and typical elements for properly focusing an image of the instruments upon film 42; but other suitable means may be employed since these particular elements are not limitative upon the present invention.

Mounted upon ring 30 to surround opening 31 and projecting therefrom forwardly toward the instruments at 18 and 25, is a hollow frusto-conical light shield 45. The central angle of shield 45 is such that the interior surface of the shield when projected includes all, or substantially all, of the face of speedometer 18, as indicated by dotted lines 46 of Fig. 2. The inner surface of shield 45 at its smaller or rearward end coincides with opening 31. This surface is made non-reflective by providing on the surface a plurality of closely spaced parallel annular grooves. This surface is also painted with black, non-reflecting paint. With this arrangement, shield 45 is located within the circle of lamps 33 and the light source is surrounding the shield. As will be more fully explained later, the shield is located with its larger end toward the areas to be photographed in order that the shield is effective to shade the nearer area which is the face of stop watch 25.

Mounted upon the outer end of shield 45 is an annular ring 48 which serves as a light diffusing element interposed between the light source and the areas to be photographed. Ring 48 fills the gap between the end of shield 45 and the inner surface of the housing wall. This light diffusing element is an optional member and may be made of any suitable material, for example glass or any transparent synthetic resin, such as the acrylic plastics commonly sold under the trade names "Lucite" and "Plexiglas." One surface of ring 48 is frosted or otherwise treated so that incident light rays falling directly on the ring are scattered or diffused as they pass through it. Although any suitable type of frosting or surface treatment may be used, it is preferred to treat the surface in such a manner as to provide a large number of small radially extending grooves. This has the advantage that light rays from each lamp 33 are spread principally along an arcuate segment of the diffusing element and are spread to a lesser extent in a direction radial of the diffusing element. This is done in order to fill in the space between the individual filaments of lamps 33 so that when the diffusing element is viewed from the side opposite lamps 33, the light intensity is relatively uniform around the element.

In describing the lighting obtained with this arrangement, an initial condition is assumed in which the light diffusing ring 48 is omitted. Without the ring, it is evident that light rays from any lamp 33 can pass around shield 45 and, traveling in a straight line, reach directly the annular portion of the speedometer face 18a around and behind the stop watch. Since this part of the speedometer face is located in the path of direct light rays from the light source, it is considered to be directly illuminated; and this is so even when ring 48 is used since substantially the same amount of light reaches the speedometer face in either case. There is only a small light loss caused by transmission through ring 48.

Opaque shield 45 casts a shadow upon the face of stop watch 25 and shades the face of the stop watch from light rays reaching it directly from light source 33. The stop watch and shield 45 are so located with respect to each other that the face of the watch is at the base of the cone of shade cast by the shield, as indicated by lines 50. Direct light rays outside of these lines do not strike the face of the watch, as the diameter of the face of the watch is preferably equal to, or slightly less than, the diameter of the shade cone at this location.

That portion of the inner surface of housing 12 between ring 30 and the more remote area to be illuminated, the face of speedometer 18, is made light reflective. This can be done by applying a coat of white paint for example. As a consequence, a ray of light from lamp 33 as indicated at 51 is deflected from its initial course by being reflected from the housing wall along line 52 and thereby reaches the stop watch face to illuminate it. Other light rays similarly reflected from the housing wall reach the watch face to illuminate it in the zone between lines 50 and 52. All of these rays reflected from the housing wall are considered to be indirect illumination of the watch face. This is in contrast with the light rays that are able to travel directly to the speedometer face.

Lines 52 constitute the boundary or surface of an imaginary cone with its apex at or just in front of the watch face. Within this cone, lighting is of very low intensity, for any light rays to reach it must be reflected more than once. For this reason, cone 52 is defined as a zone of total shade cast by the shield 45. Between the lines 52 and 50 is a zone of only partial shade because it is illuminated indirectly by reflected light as described above; while outside of lines 50 is a zone that is illuminated directly from the light source.

The presence of light diffusing element 48 does not basically change this light relationship. Rays of light otherwise able to reach the speedometer face directly from the light source, are diffused somewhat by element 48 but still reach the remote area to be photographed without being reflected before reaching that area. Element 48 also diffuses the reflected rays falling upon the near area, the watch face. A certain amount of the light incident upon the diffusing element is deflected radially; but the total illumination on the watch face is increased if anything, rather than decreased, by the diffusing ring. If desired, ring 48 can be given localized treatment to screen or diffuse more or less of the light. It may, if desired, be made to deflect by refraction some of the incident light to add to the illumination of the watch face at the expense of light on the speedometer face.

All the light reflected off the housing wall onto the watch face passes through diffusing element 48, which in its preferred form has the effect of more evenly distributing the reflected light over the watch face and removing any glare or bright spots. As a result, there are no bright reflections from the glass crystal 25b covering the watch face, and it is now possible to use a flat crystal 25b without producing objectionable reflections. A flat crystal gives better photographic reproduction of the watch face than one curved at the edges.

For a given light value at source 33, the two instrument faces can be shifted toward or away from the light source to obtain equal light intensity on the two faces; and the axial length of shield 45 is calculated to locate the shade at the desired position. Shoulder 20 is then located to permit the instrument faces to be returned to the desired position.

It will be evident that various changes in the exact design and arrangement of the parts of my lighting system may occur to persons skilled in the art, but without departing from the principles of my invention. Accordingly, it is to be understood that the foregoing description is considered to be illustrative of, rather than limitative upon, the appended claims.

I claim:

1. A lighting system for illuminating with approximately equal intensity two areas located one in each of two parallel spaced planes with both areas facing in the same direction toward the light source, comprising: a source of light illuminating directly the remote area; a shield located between the light source and the areas to be illuminated and located to shade the nearer area from light rays directly from the source; and means receiving light directly from said source and deflecting a portion of the incident light onto the nearer area to illuminate the nearer area indirectly but at approximately the same intensity as the remote area.

2. A lighting system for illuminating with approximately equal intensity two areas located one in each of two parallel spaced planes with both areas facing in the same direction toward the light source, comprising: a source of light illuminating directly the remote area; a shield located between the light source and the areas to be illuminated and located to shade the nearer area from light rays directly from the source; and a light reflecting element located outside the path of light rays directly illuminating the remote area, said reflecting element being illuminated directly from the source and reflecting incident light to illuminate the nearer area at approximately the same intensity as the remote area, the nearer area being located beyond the total shade cast by the shield.

3. A lighting system for illuminating with approximately equal intensity two areas located one in each of two parallel spaced planes with both areas facing in the same direction toward the light source, comprising: a source of light; a shield located between the light source and the areas to be illuminated and located to shade the nearer area from light transmitted directly from the source to the nearer area; and a light diffusing element through which passes all light from the source reaching both said areas, a part of the light being deflected by the diffusing element to illuminate the nearer area at approximately the same intensity as the remote area, the nearer area being located beyond the total shade cast by the shield.

4. A lighting system as in claim 3 in which the light source is a plurality of lamps evenly spaced apart.

5. A lighting system for illuminating evenly and with approximately equal intensity two instrument faces arranged in parallel planes at different distances from a light source, comprising: a tubular housing enclosing said instruments; a hollow, frusto-conical shield inside the housing with its axis normal to said planes and its larger end toward the instruments; a light source of annular configuration surrounding the shield and located relative thereto so that the larger end of the shield shades the nearer instrument from light transmitted directly to the nearer instrument; a light reflecting surface illuminated directly by the source and reflecting light incident thereon to illuminate the nearer instrument at approximately the same intensity as the remote instrument; and an annular light diffusing element around the shield between the source and the instruments to diffuse all light reaching both instruments.

6. A lighting system as in claim 5 in which the light source includes a plurality of evenly spaced lamps arranged around the shield.

7. A lighting system as in claim 5 that also includes a mirror adjacent the smaller end of the frusto-conical shield and oblique to the axis of the shield to reflect a composite image of both instruments through an aperture in the housing wall.

8. A lighting system as in claim 5 that also includes an opaque ring engaging the housing and upon which the frusto-conical shield is mounted at its smaller end; and the light source includes a plurality of lamps mounted on said ring.

9. A lighting system for illuminating evenly and with approximately equal intensity two instrument faces arranged in parallel planes at different distances from a light source, comprising: a tubular housing enclosing said instruments and having a light reflective interior surface; a hollow, frusto-conical shield inside the housing with its axis normal to said planes and its larger end toward the instruments; and a light source of annular configuration surrounding the shield and located relative thereto so that the larger end of the shield shades the nearer instrument from direct light but not from light reflected from the housing, direct light from said source illuminating the remote instrument.

10. A lighting system for illuminating evenly and with approximately equal intensity two instrument faces arranged in parallel planes at different distances from a light source, comprising: a tubular housing enclosing said instruments and having a light-reflective interior surface; a hollow, frusto-conical shield inside the housing with its axis normal to said planes and its larger end toward the instruments; a light source of annular configuration surrounding the shield and located relative thereto so that the larger end of the shield shades the nearer instrument from direct light but not from light reflected from the housing, direct light from said source illuminating the remote instrument; and an annular light diffusing element around the shield between the source and the instruments to diffuse all light reaching both instruments, reflected light from the housing passing through the diffusing element to illuminate the nearer instrument at approximately the same intensity as the remote instrument.

11. The combination comprising: a speedometer with a planar face; a watch having a planar glass lens disposed in front of and spaced from the face of the speedometer, the watch and speedometer both facing in the same direction; a tubular housing enclosing both the speedometer and the watch and having a light-reflective interior surface; a frusto-conical shield inside the housing with its axis normal to the watch lens and its larger end toward the speedometer and watch; and a source of light radially outward of the shield and located relative thereto so that the larger end of the shield shades the watch lens from direct light from the source but does not shade the watch lens from light reflected by the housing, direct light from the source illuminating the speedometer face.

References Cited in the file of this patent

UNITED STATES PATENTS

| | | |
|---|---|---|
| 755,584 | Shepherd | Mar. 22, 1904 |
| 1,685,421 | Huntington | Sept. 25, 1928 |
| 1,757,395 | Schwarze | May 6, 1930 |
| 1,757,493 | Wharam | May 6, 1930 |

FOREIGN PATENTS

| | | |
|---|---|---|
| 573,677 | Germany | Apr. 4, 1933 |